US007653244B2

(12) United States Patent
Potts et al.

(10) Patent No.: US 7,653,244 B2
(45) Date of Patent: Jan. 26, 2010

(54) INTELLIGENT IMPORTATION OF INFORMATION FROM FOREIGN APPLICATIONS USER INTERFACE

(76) Inventors: Wesley F. Potts, 1520 Sycamore Ridge, Lansing, KS (US) 66043; Brian G. Anderson, 14884 S. Summit, Olathe, KS (US) 66062; Jason L. Rogers, 16052 246th, Tonganoxie, KS (US) 66086; Humayun H. Khan, 12843 King St., Overland Park, KS (US) 66213; Scott T. R. Coons, 801 Fox Chase Ct., Lawrence, KS (US) 66049

( * ) Notice: Subject to any disclaimer, the term of this patent is extended or adjusted under 35 U.S.C. 154(b) by 448 days.

(21) Appl. No.: 11/358,436

(22) Filed: Feb. 21, 2006

(65) Prior Publication Data

US 2007/0009155 A1 Jan. 11, 2007

Related U.S. Application Data

(60) Provisional application No. 60/655,065, filed on Feb. 22, 2005.

(51) Int. Cl.
*G06K 9/00* (2006.01)
(52) U.S. Cl. ............... 382/181; 382/156; 382/311; 715/700
(58) Field of Classification Search ................ 382/181
See application file for complete search history.

(56) References Cited

U.S. PATENT DOCUMENTS

| 4,553,206 | A | 11/1985 | Smutek et al. |
| 4,817,050 | A | 3/1989 | Komatsu et al. |
| 4,819,156 | A | 4/1989 | DeLorme et al. |
| 4,992,887 | A | 2/1991 | Aragaki |
| 5,022,090 | A | 6/1991 | Masaki et al. |
| 5,022,091 | A | 6/1991 | Carlson |
| 5,025,483 | A | 6/1991 | Dinan et al. |
| 5,133,024 | A | * | 7/1992 | Froessl .............. 382/282 |

(Continued)

OTHER PUBLICATIONS

Arica,N., Yarman-Vural, F.T., "An overview of character recognition focused on off-linehandwriting", Systems, Man, and Cybernetics, Part C: Applications and Reviews, IEEE Transactions on, May 2001, vol. 31, Issue: 2, ISSN: 1094-6977.*

(Continued)

*Primary Examiner*—Sath V Perungavoor
(74) *Attorney, Agent, or Firm*—Robert O. Enyard, Jr.; Polsinelli Shughart PC

(57) ABSTRACT

A process for intelligent importation of information from a foreign application user interface includes extraction of raster data from a pre-designated region of a screen displayed in the foreign application, segmentation of the raster data into prospective sets of character raster data; application of the character raster data and a feature data set and a vector data set derived from the character raster data as inputs to respective raster, feature, and vector artificial neural networks to generate candidate characters; using a voting process to identify a character represented by the character raster data from the candidate characters; assembly of the remaining characters as recognized by the neural networks into a key; and association of the key with an external data file which may be stored and thereafter retrieved in association with the screen displayed in the foreign application.

24 Claims, 8 Drawing Sheets

U.S. PATENT DOCUMENTS

| | | | |
|---|---|---|---|
| 5,208,905 A | | 5/1993 | Takakura et al. |
| 5,231,579 A | | 7/1993 | Tsuchiya et al. |
| 5,337,370 A | * | 8/1994 | Gilles et al. ................. 382/102 |
| 5,406,384 A | * | 4/1995 | Sakuragi ..................... 358/403 |
| 5,442,715 A | * | 8/1995 | Gaborski et al. ............ 382/187 |
| 5,475,768 A | * | 12/1995 | Diep et al. .................. 382/156 |
| 5,521,985 A | * | 5/1996 | Camp et al. ................. 382/176 |
| 5,586,240 A | * | 12/1996 | Khan et al. ................. 715/201 |
| 5,633,954 A | * | 5/1997 | Gupta et al. ................ 382/187 |
| 5,745,610 A | * | 4/1998 | Johnson ...................... 382/309 |
| 5,832,108 A | * | 11/1998 | Fukita et al. ................ 382/159 |
| 5,835,633 A | * | 11/1998 | Fujisaki et al. .............. 382/187 |
| 5,884,296 A | * | 3/1999 | Nakamura et al. ........... 706/20 |
| 6,128,102 A | * | 10/2000 | Ota ............................. 358/403 |
| 6,446,119 B1 | * | 9/2002 | Olah et al. .................. 709/224 |
| 6,985,643 B1 | * | 1/2006 | Fahraeus et al. ............ 382/313 |
| 7,016,529 B2 | * | 3/2006 | Simard et al. ............... 382/155 |
| 7,085,437 B2 | * | 8/2006 | Nakajima et al. ........... 382/311 |
| 7,286,699 B2 | * | 10/2007 | Simard et al. ............... 382/155 |
| 2004/0181815 A1 | * | 9/2004 | Hull et al. ................... 725/134 |
| 2005/0035193 A1 | * | 2/2005 | Gustin et al. ................ 235/379 |

OTHER PUBLICATIONS

O. D. Trier, A. K. Jain, T. Taxt, "Feature extraction methods for character recognition—A survey", Pattern Recognition 29, pp. 641-662, 1996.*

Arica N. Yarman-Vural, F.T., "An overview of character recognition focused on off-linehandwriting", Systems, Man and Cybernetics, Part C: Applications and Reviews, IEEE Transactions on, May 2001, vol. 31, Issue: 2, ISSN: 1094-6977, entire document.

International Search Report for International Application No. PCT/US06/06180, Intelligent Importation of Information from Foreign Application User Interface Using Artificial Intelligence, dated Jul. 2, 2008, 4 pages.

Written Opinion of the International Searching Authority for International Application No. PCT/US06/06180, Intelligent Importation of Information from Foreign Application User Interface Using Artificial Intelligence, dated Jul. 2, 2008, 7 pages.

* cited by examiner

INTELLIGENT IMPORTATION OF INFORMATION FROM FOREIGN APPLICATIONS USER INTERFACE

CROSS-REFERENCE TO RELATED APPLICATION

This application claims priority under 35 U.S.C. 119(e) and 37 C.F.R. 1.78(a)(4) based upon copending U.S. Provisional Application, Ser. No. 60/655,065 for INTELLIGENT IMPORTATION OF INFORMATION FROM FOREIGN APPLICATION USER INTERFACE BY LAYERED APPLICATION UTILIZING ARTIFICIAL INTELLIGENCE filed Feb. 22, 2005.

BACKGROUND OF THE INVENTION

The present invention relates to a process for integrating document management and imaging system functionality with a user interface of a "foreign" or unrelated application in a separate process through the use of artificial neural networks.

All forms of business require record keeping related to employees, customers, suppliers, service providers, inventory, transactions, billing, payments, and the like. For such record keeping, most companies employ business application software which typically includes database management functions along with calendar and financial functions. In addition to traditional types of database records, it is also necessary to keep records of supporting documents, such as orders, invoices, statements, checks, photographs, diagrams, bids, contracts, disclaimers, and so forth. Many existing business applications have no built-in capability for accessing or managing digitized copies of such supporting documents, with the necessity that paper copies be stored. It is generally not desirable to modify an existing business application to add image management capabilities and may also be contrary to the terms of the license for the software. Alternatively, the costs and disruptions involved in installing new software with built-in image management capabilities and training employees to use it can be prohibitive. For these reasons, techniques to "image enable" existing business applications have been developed.

Current desktop computers and operating systems have the capability of multitasking, that is, executing multiple programs simultaneously or, at least, having multiple programs open simultaneously and quickly accessible. Thus, it is possible to run a business application and an image management program simultaneously on commonly available computers. The business application is used to process business records while the image management program provides access to stored digital images of documents which support the business records. The goal of image enablement is to provide a convenient link between business records and the particular image files related to those records.

The linking of elements of business records to images often involves keying the contents of a particular data field of a business record to the file name of the digital image. For example, a customer account number, an invoice number, an address or phone number, a social security number, or the like which appears in an appropriate data field of a record could be used as a key to an associated image. The contents of the data field is selected automatically, by the image management software placing a cursor at the beginning of the character string or by highlighting the string. The image management software is activated by either a particular keystroke combination or a mouse click on an icon on a toolbar or task bar, and a scanned image of a supporting document is saved along with the contents of the data field, and possibly other information, such as the position of the data field on the screen. The linking software obtains the data field contents by reading it from the display buffer or by intercepting the data as it is output to the computer display. The image of the supporting document can be recalled when the associated record is displayed by selecting the variable of the appropriate data field and activating the image management software which then retrieves the image file with which the data field variable is associated and displays the image. A process for such an image enablement technique is detailed in U.S. Pat. No. 5,586,240, which is incorporated herein by reference.

The image enablement processes described above are suitable for business applications which are text based since text characters are typically encoded in a standard manner, such as in ASCII codes. However, some applications do not output display data in a text format with some graphics, but in an entirely graphics format. This is sometimes referred to as "painting the screen" with rasterized or pixel format data which depicts text in any of a number of fonts of selected point sizes and colors along with various kinds of graphics. Business applications with such displays are not suited to conventional processes for image enablement.

SUMMARY OF THE INVENTION

The present invention provides a greatly improved means for translating information from a host application into data that can be stored to link images or documents between two different applications. The techniques embodying the present invention can be applied to a host application to enable external images and documents to be associated with data in the host application which is displayed in a non-ASCII, rasterized text format and without affecting operation of the host application.

The present invention relates to a method for the acquisition of data across process boundaries on a computer system. The present invention is directed to an intelligent importation process for extracting selected data from an application program which displays the data as a raster representation thereof, without affecting operation of the application program, and converts the raster data to another form, such as ASCII text data, using one or more artificial neural networks.

The intelligent importation process is set up for a particular application by selection of one or more areas of a screen displayed by the application, such as a data record, from which data will be extracted. The areas correspond, for example, to data fields of such a data record and will contain text data which can be used as keys associated with files external to the host application, such as images in an image management system. Coordinates of the selected screen areas are stored by the process. The text data which populates actual data records will be displayed in a rasterized or pixel format. The intelligent importation process is trained to separate or segment characters displayed in the rasterized text data and recognize the characters using one or more artificial neural networks. Once the process has been trained and set up, it can be used to perform operations based on the extracted and recognized rasterized data displayed by the host application, without affecting operation of the application. In the present invention, the process is used to "image enable" the host application by enabling the storage and retrieval of images associated with particular data records. While the present invention is primarily described in terms of associating keys with image files, it is recognized that other types of files external to the host application could be keyed for association with data records, such as sound files, video clips, and even external text files. Such types of data files are considered "external" to the host application in that the host application is not capable of directly rendering data from such files, that is, displaying or playing data from such external data files. Such other types of data files are considered to be functionally equivalent to image files and are intended to be encompassed by the present invention.

In general, the invention can be divided into three processing methods and three phases that each utilize the three methods. The three processing methods include raster processing, feature processing, and vector processing. The three phases include a training phase, a testing phase, and a production phase. With the use of artificial intelligence algorithms and data constructs, data is extracted from an application or program based on the raster representation displayed by that application. The use of artificial intelligence and the means by which the raster representation is both pre-processed and post-processed are integral parts of the present invention.

In a training phase of the present invention, the artificial neural networks are conditioned to recognize different input sets as the same data value, and the raster input is processed to morph it into an input set that can be worked on by the different neural networks. The training phase is made up of many executions of the training logic including the knowledge of the data each raster region represents. Based on the scores that the artificial neural networks generate for each possible data output, the decision points in the network are adjusted to move the network closer to the correct answer. This process is called "feed-forward" and "back-propagation".

The pre-processing of the raster representation of the image begins with isolating the area to be recognized by the artificial neural networks. In this case that will be one data item at a time. A typical data item is a pixel or raster representation of an alphanumeric character, although other symbols could also be employed, such as punctuation symbols, non-English characters, and the like. Once the region has been separated it is then run through a thresholding algorithm that separates the pixels of interest from background noise in the application. The result of this step is a binary raster representation of the region to be recognized. Following the threshold step a segmentation loop is initiated. In the training phase, this processing is limited since only a single data item, of a training set of items, is drawn at a time to train the artificial neural networks.

At this point the segmented raster representation is saved, and a copy is made to enable processing the raster data in different ways to provide varying inputs to different artificial neural networks associated with the three processing methods. The first network is a raster artificial neural network. To morph the raster data to meet these inputs, it must be scaled using bi-cubic interpolation to a common size. That is, the pixel grid of the raster data of interest must be dimensionally scaled to a standard size using so-called bi-cubic interpolation, which is a common technique for enlarging and reducing the size of digital images. Two standard sizes that are preferred in the present invention are 16×16 and 12×12 pixels, corresponding to networks of 256 inputs and 144 inputs respectively to the raster processing artificial neural network. These are just two of the possible embodiments of the input to the raster artificial neural network and are not intended to limit the scope of the invention as defined in the appended claims. While performing the bi-cubic interpolation, the binary raster data is transformed into 256 level grayscale data.

That data is then transformed between −1 and 1 where a 0 grayscale value will equal −1 and a 256 grayscale value will equal 1.

Then each data item is processed and the training logic is performed, as well as the feed-forward and back-propagation. In this process the rate at which the decision points or neuron weights are altered is adjusted as the process gets close to the local minima which will capture the best approximation of the recognition function across the input set. Should the mean squared error increase, the amount by which the decision points or neuron weights are altered is reduced. Conversely, should the mean squared error decrease, the amount by which the decision points or neuron weights on each back-propagation are adjusted is increased. This network can be trained independent of the other network types employed.

A copy of the segmented raster representation of the data item is used for feature based processing which is the second processing method. This time the data will be transformed for input into a feature based artificial neural network. Additional processing is done prior to extracting these features. First, the image is scaled to a 50 by 50 pixel raster representation and skeletonized, and a staircase removal algorithm is employed to scrub the pattern down to a consistent representation that is font independent and can be analyzed for such character "features" as vertical and horizontal histograms, endpoint locations, and intersection locations (based on a 9×9 image grid to limit the inputs). In the same manner as in the raster network, these features are translated into inputs to an artificial neural network that is being trained to recognize the characters in the same feed-forward, back-propagation method as the raster case.

The third processing method is vector based processing which begins with a copy of the segmented raster representation of the data item. This time the data will be transformed into a vector representation and the bounding sine wave will be calculated using a Fourier Transform. Generally, a rough outline of a character is made of a sequence of vectors having run-length magnitudes and directions of segments of the outline, for example 30 such segments. The first 30 Fourier coefficients will be processed to be translation, rotation, and scale invariant and then used as inputs for the vector artificial neural network recognition system. These inputs are then fed into an artificial neural network that is being trained to recognize the characters in the same feed-forward, back-propagation method as both the raster and the feature based cases.

Once the training phase has been completed (that is each of the above engines correctly identify the training set and have an acceptable mean squared error), each engine is then run through a testing set of data items which are not included in the training set. Based on the recognition rates and the success rates for certain characters a voting structure is set up which receives the outputs of the raster, feature, and vector processes.

To extract data from another process in this manner, the screen is learned. The user must identify the application that data is to be extracted from as well as the areas where the data can be found in the application. Once the region on the application is isolated, recognition processes can be initiated. The raster representation of this region is extracted from the application and run through a thresholding method to remove extraneous pixels, such as boxes around the region, and transform it into a binary raster representation. Then a recognition loop is initiated. Typically, the raster representation selected contains a string of data items or characters to be recognized and associated with an image or document external to the host application. The first data item is segmented at the most likely point according to a vertical histogram of the entire region, and that raster representation is processed through instances of the artificial neural networks identified in the training phase and the methods outlined for recognition in each one. The output vectors of the different networks are then compared based on manual configuration settings and a vote is taken for the most likely character. If the voting confidence falls below a predefined level the raster representation is placed back into the region and a new segmentation point is taken based on the vertical histogram and the process is repeated until the maximum possible raster ratio for a data element is exceeded or an acceptable recognition takes place. This phase uses all the pre-processing, recognition and post-processing steps to translate the raster representation of an application into data used by a document management system.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
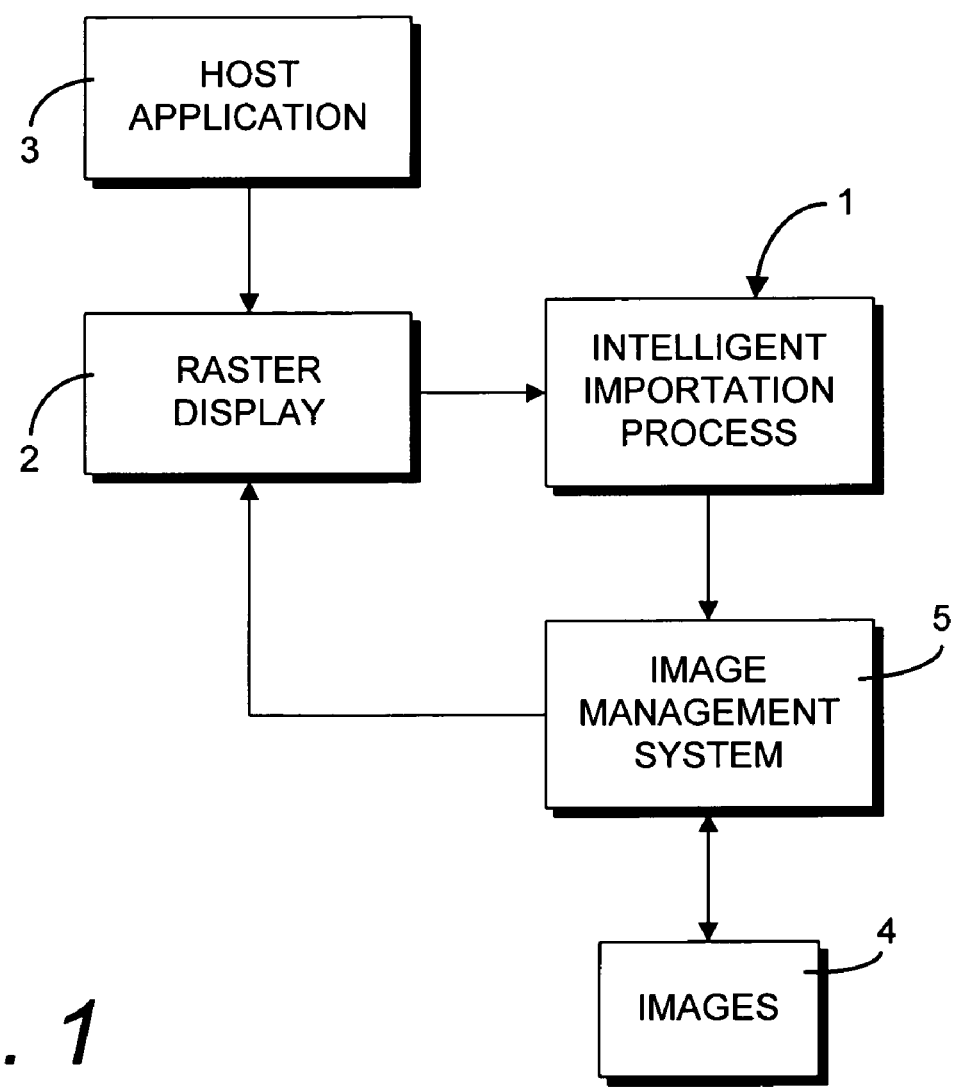
FIG. 1 is a simplified block diagram illustrating principal components of an environment of operation of a process for intelligent importation of information from a foreign application user interface which embodies the present invention.

Referring to the drawings in more detail, the reference numeral 1 generally designates a process for intelligent importation of information from a user interface or raster display 2 (FIG. 1) of a foreign or host application 3 using artificial intelligence. The process 1 has potential for application to a number of solutions and in the present invention is used to image-enable the host application 3 keying external files, such as images 4, to data displayed in rasterized form by the host application. The host application 3 may be any of a number of software applications such as, for example, Oracle Financials (Oracle Corporation of Redwood Shores, Calif., www.oracle.com). The process 1 may cooperate with a separate image management system 5 to store and retrieve the images 4 or may incorporate such an image management system internally. The process 1 must be trained to recognize text characters or symbols and must be set up for the particular host application 3, as will be detailed below.

Figure 2:
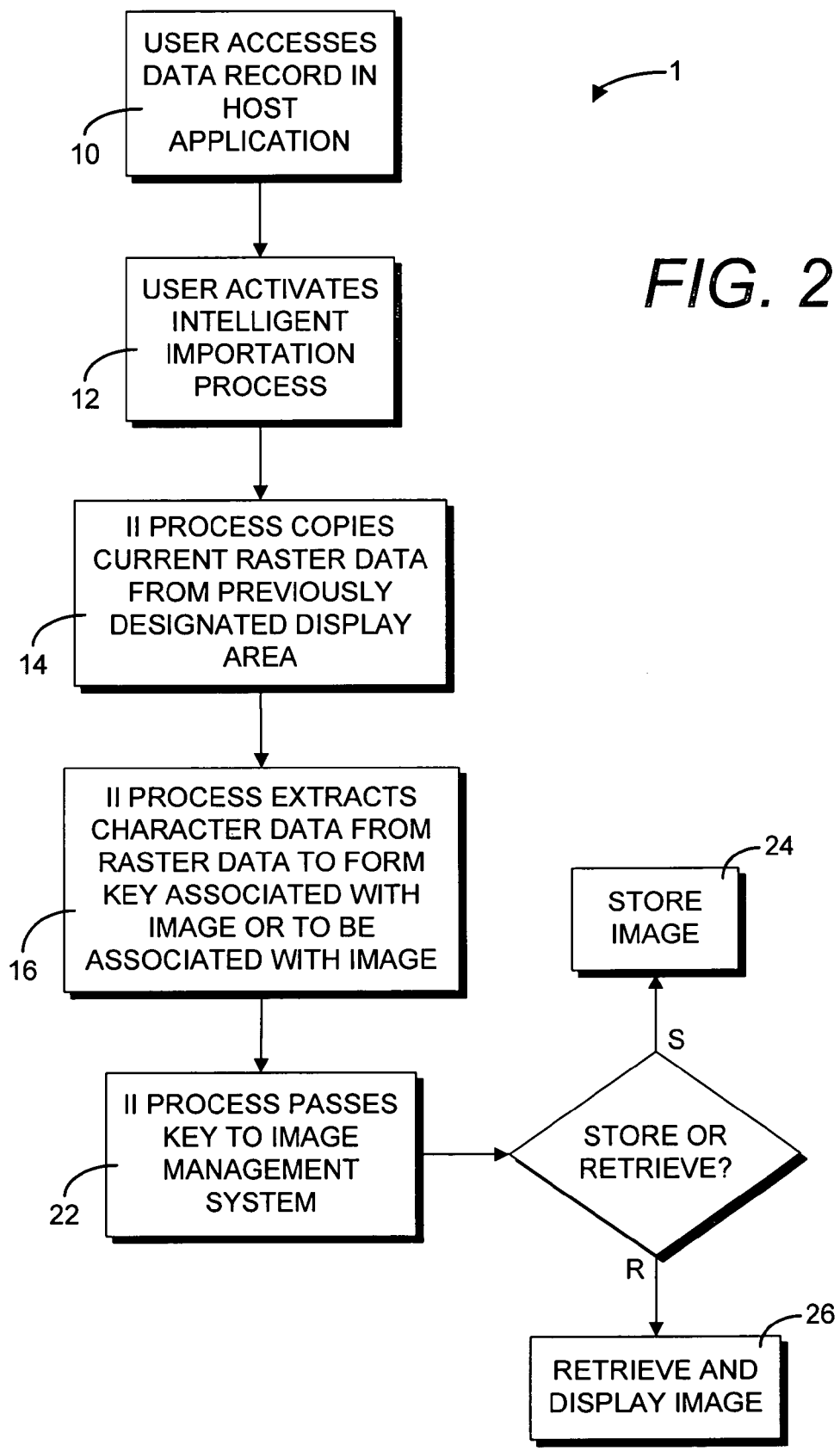
FIG. 2 is a simplified flow diagram illustrating principal functional operations of the intelligent importation system of the present invention.

The host application 3 may be a stand-alone application or a client/server type of software. The host application 3, or a client component thereof, is run with the process 1 running in the background. Referring to FIG. 2, at step 10 a user accesses a data record in the host application 3. If the user needs to view a previously stored image 4 or store an image, at step 12 the user activates the intelligent importation (II) process 1, as by a keystroke combination or by mouse clicking an icon or button on the display 2. The process 1 copies current raster data from a previously designated display area of the display 2 at step 14. At step 16, the process 1 extracts character data from the raster data to form a key previously associated with a stored image 4 or to be associated with an image to be stored by the image management system 5. The process 1 extracts the character data from the raster data using one or more artificial neural networks 18, 19, and 20 (FIG. 3) as will be detailed further below. At step 22, the process 1 passes the key to the image management system 5 which either stores an image 4 at step 24 or retrieves and causes the display of the image at step 26.

Figure 3:
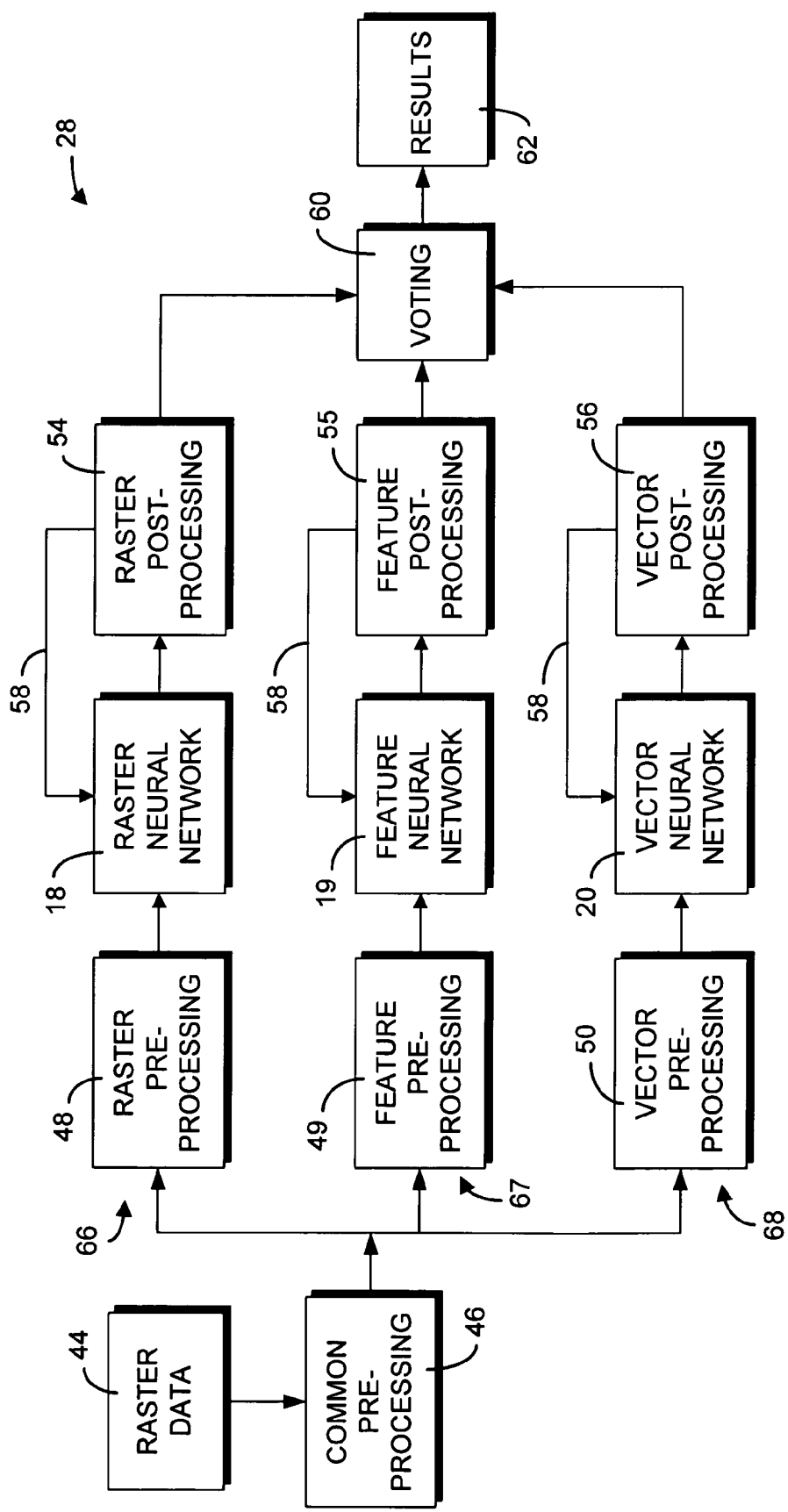
FIG. 3 is a block diagram illustrating the principal functional components of the intelligent importation process of the present invention.

FIG. 3 illustrates core extraction processing components 28 of the intelligent importation process 1 of the present invention. The core components 28 include the artificial neural networks 18-20. Generally, an artificial neural network, as used in the present invention, is a system of simulated neurons defined by equations which are interconnected in such a way as to be capable of being trained to recognize various patterns of data. A pattern of raster data can be analyzed in a number of ways to thereby generate unique sets of data associated with the same raster pattern. Such sets of data for known patterns can be applied as inputs to neural networks to train the networks to recognize the patterns. Thereafter, sets of data for unknown patterns of raster data can be applied to the inputs of the networks for recognition.

Figures 6, 7:
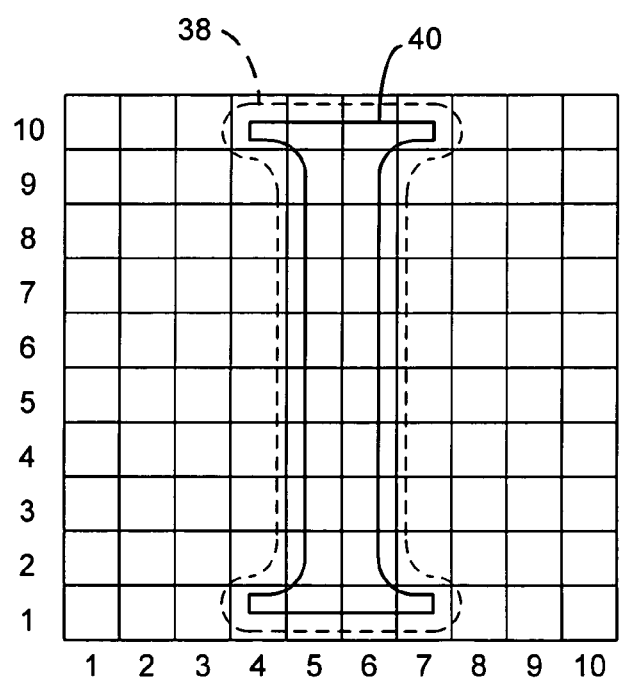
FIG. 6 is a raster diagram of an upper case "i" shown in a 10 by 10 pixel matrix which can be applied as inputs to an artificial neural network for training or recognition in the present invention.
FIG. 7 is a diagram of an upper case "i" for processing using a Fourier transform to generate coefficients which will be applied to an artificial neural network for training or recognition in the present invention.
Figure 8A:
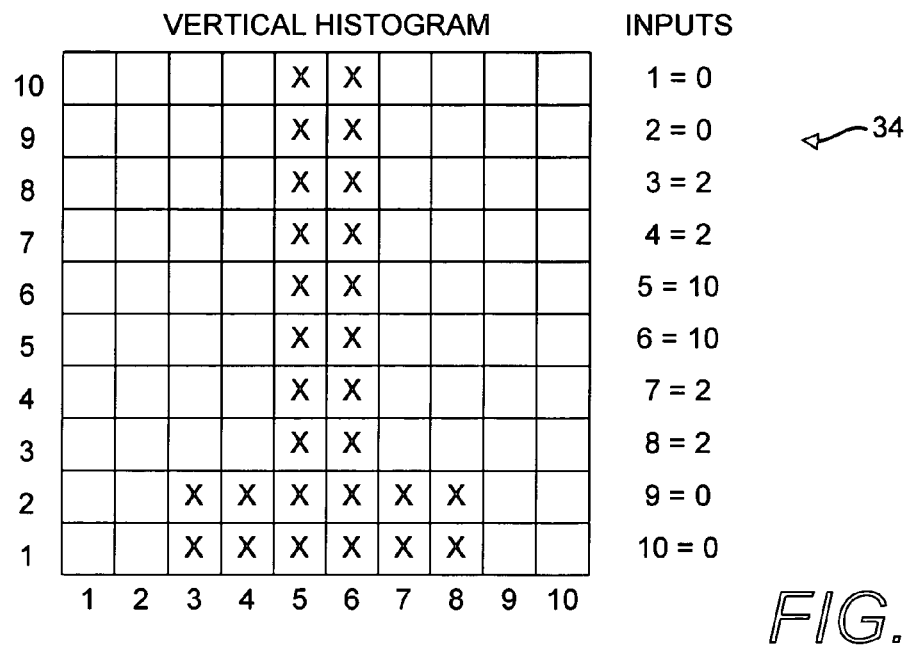
FIG. 8a is a vertical histogram of an upper case "i" shown in FIG. 6 which can be applied as inputs to an artificial neural network for training or recognition in the present invention.
Figure 8B:
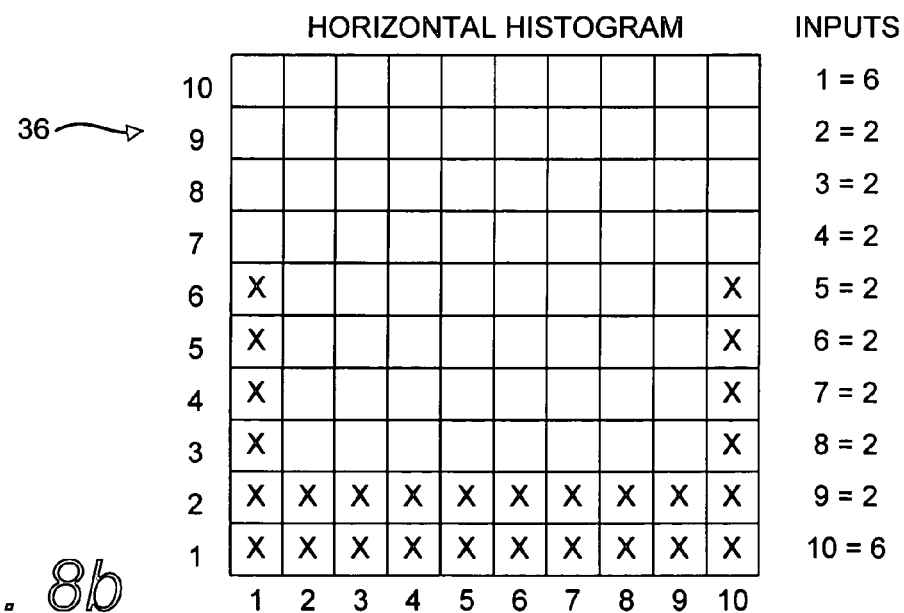
FIG. 8b is a horizontal histogram of an upper case "i" shown in FIG. 6 which can be applied as inputs to an artificial neural network for training or recognition in the present invention.

The present invention includes three methods of analyzing or processing raster pattern data and provides an artificial neural network for each method. The first method is analysis of the rectangular coordinates of character pixels and binary color (black or white) of each pixel. For this a raster neural network 18 is used. FIG. 6 illustrates a raster pattern 32 of a character, such as an upper case "i". The second processing method analyzes certain features of the raster pattern 32 and makes use of a feature neural network 19. FIGS. 8a and 8b respectively illustrate a vertical histogram 34 and a horizontal histogram 36 of the raster pattern 32 shown in FIG. 6 which can be input to the feature neural network 19. The third processing method is vector processing and makes use of a vector neural network 20 to analyze vectors which describe an outline 38 of the character 40, also an upper case "i".

The neural networks 18-20 are conventional implementations of neural networks and are of a type known as a multi-layer feed forward perceptitron (or perceptron). The preferred neural networks 18-20 include one input layer, two hidden layers, and one output layer. The node or simulated neuron content of the layers of the illustrated networks 18-20 is, for example, 144, 94, 70, and 94 respectively, although the present invention is not intended to be limited to such node content. Further understanding of this general type of neural network can be obtained by reference to U.S. Pat. No. 4,918,618, which is incorporated herein by reference.

Returning to FIG. 3, raster data 44 from the previously designated display area is applied to common preprocessing operations 46, prior to application to the inputs of the neural networks 18-20. Generally, the purpose of the common preprocessing operations 46 is to segment the raster data into individual characters and to render the raster data 40 at a standard size and orientation. These common preprocessing steps 46 may include conversion to binary colors, resizing, de-skewing, skeletonization, as well as initial segmentation. More particular preprocessing operations 48, 49, and 50 are applied to the raster patterns 32 to derive data sets from the raster data which are appropriate and useful for each of the neural networks 18-20. The particular preprocessing operations 48-50 are different depending on which neural network 18-20 the resulting data set is to be applied to. For the raster neural network 18, the raster preprocessing operations 48 derive the coordinates of the black pixels (marked with an "X" in FIG. 6) of the raster pattern 32 within a standard size pixel matrix to be applied as inputs to the raster neural network 18. It should be noted that while the pixel matrices illustrated in FIGS. 6-8*b* are 10 by 10 pixel arrays, this is for illustrative purposes only; the actual matrix sizes are that which are appropriate for each particular neural network. For the feature neural network 19, the feature preprocessing steps form the input data set for input to the feature neural network by the column and row counts of black pixels in the vertical and horizontal histograms 34 and 36, along with coordinates of end points and intersections of strokes from the pattern 32. Finally, for the vector neural network 20, the input data set is formed by the vector preprocessing steps 50 by deriving a set of Fourier coefficients, such as the first 30, resulting from a Fourier Transform applied to vectors describing an outline 38 of the character 40 formed by the raster pattern 32 or a variation thereof.

The neural networks 18-20 are trained to recognize alphanumeric characters and certain punctuation symbols. The outputs from each of the neural networks 18-20, from processing the data sets provided by their respective preprocessing steps 48-50, are a set of candidate characters, a numeric probability of each candidate character, for example three candidate characters, and a signal to noise value for each candidate character which evaluates the possible existence of extraneous pixels in the original raster data 44. In post-processing steps 54, 55, and 56 associated respectively with the raster, feature, and vector neural networks 18, 19, and 20, the probability and signal to noise figures of each character candidate for each neural network 18-20 are evaluated against particular thresholds. If a candidate character values fail the threshold tests, retries are executed, as indicated by the retry lines 58 illustrated in FIG. 3, using different processing criteria. One possible problem which might cause failure of the threshold tests is inaccurate segmentation. To overcome this, adjustments are made to the raster pattern segmentation processing, and a limited number of retries are made to attempt to improve the probability and signal to noise figures for the candidate characters.

Once the probability and signal to noise figures pass the threshold tests, the post-processing steps 54-56 extracts the unaltered character metrics of height, width, and distance from the previous character as well as the best candidate character, signal to noise figure and probability score. Additional post-processing of the best candidate character is used to determine the case of the candidate character from the character metrics (overall dimensions in pixels) and to distinguish ambiguous characters, such as upper case "i" (I) and lower case "L" (l), from the context of the character. The results of each of the post-processing steps 54-56 are then applied to a voting process 60 which determines the final results 62. In summary, the data extraction components 28 of the process 1 employ three effectively parallel extraction processes—raster processing 66, feature processing 67, and vector processing 68—to make their best guess at each character represented in the raster data 44, and vote on their candidate characters to determine the results 62. The results 62 form a key which either is or will be associated with an image 4 in the image management system 5.

Figure 4A:
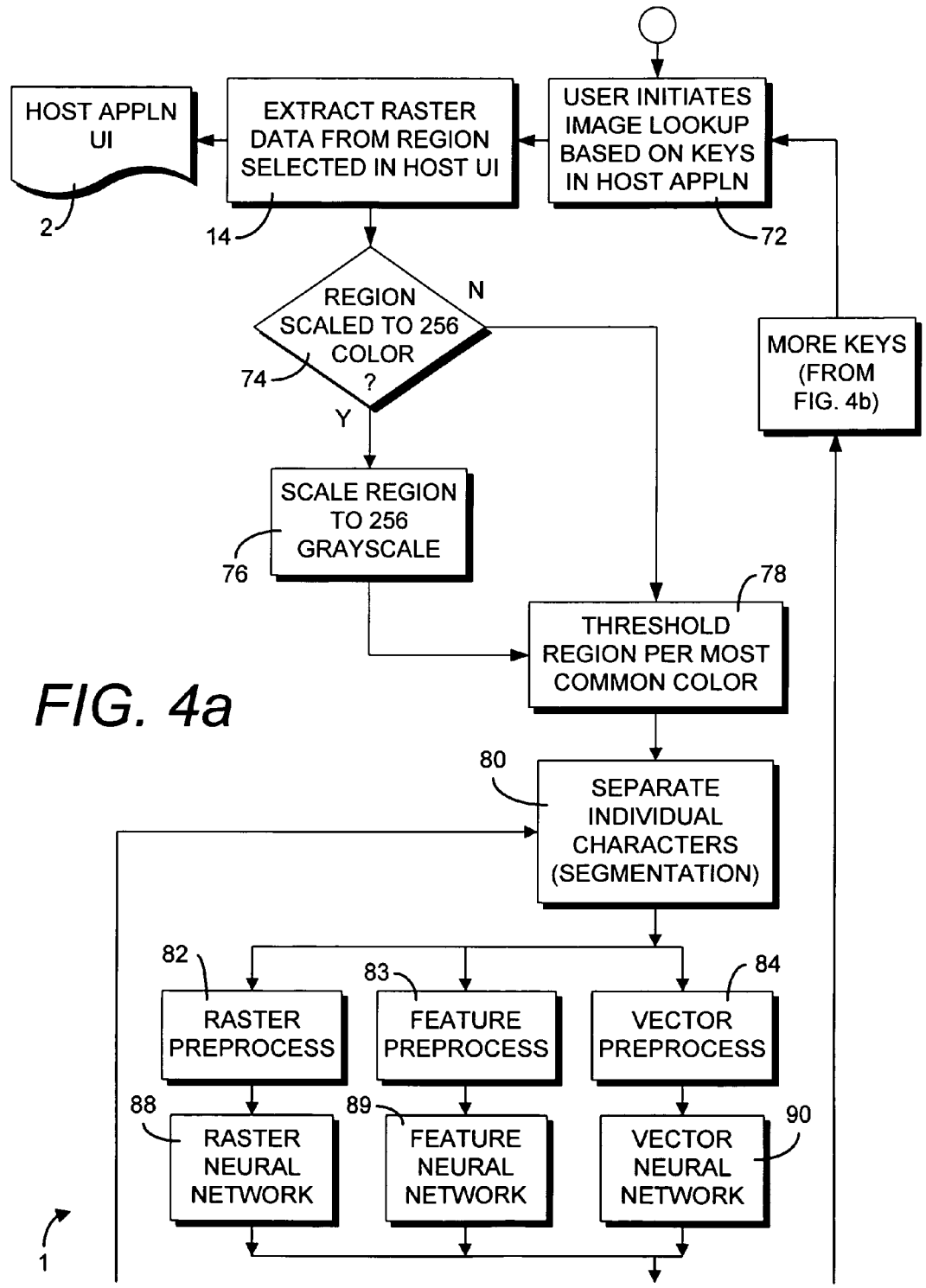
FIGS. 4a and 4b are a flow diagram illustrating principal steps in the process of the present invention.
Figure 4B:
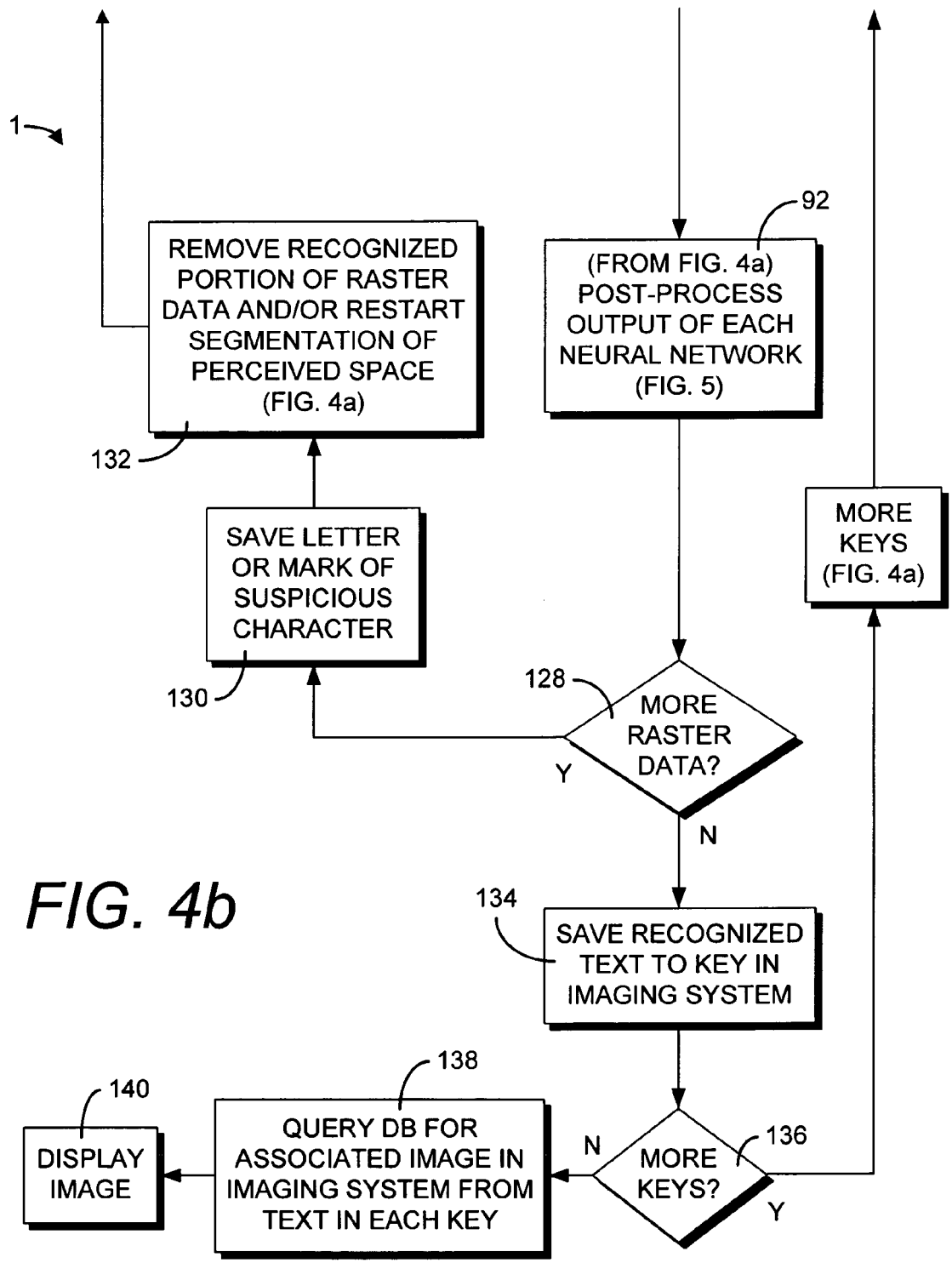
Figure 5:
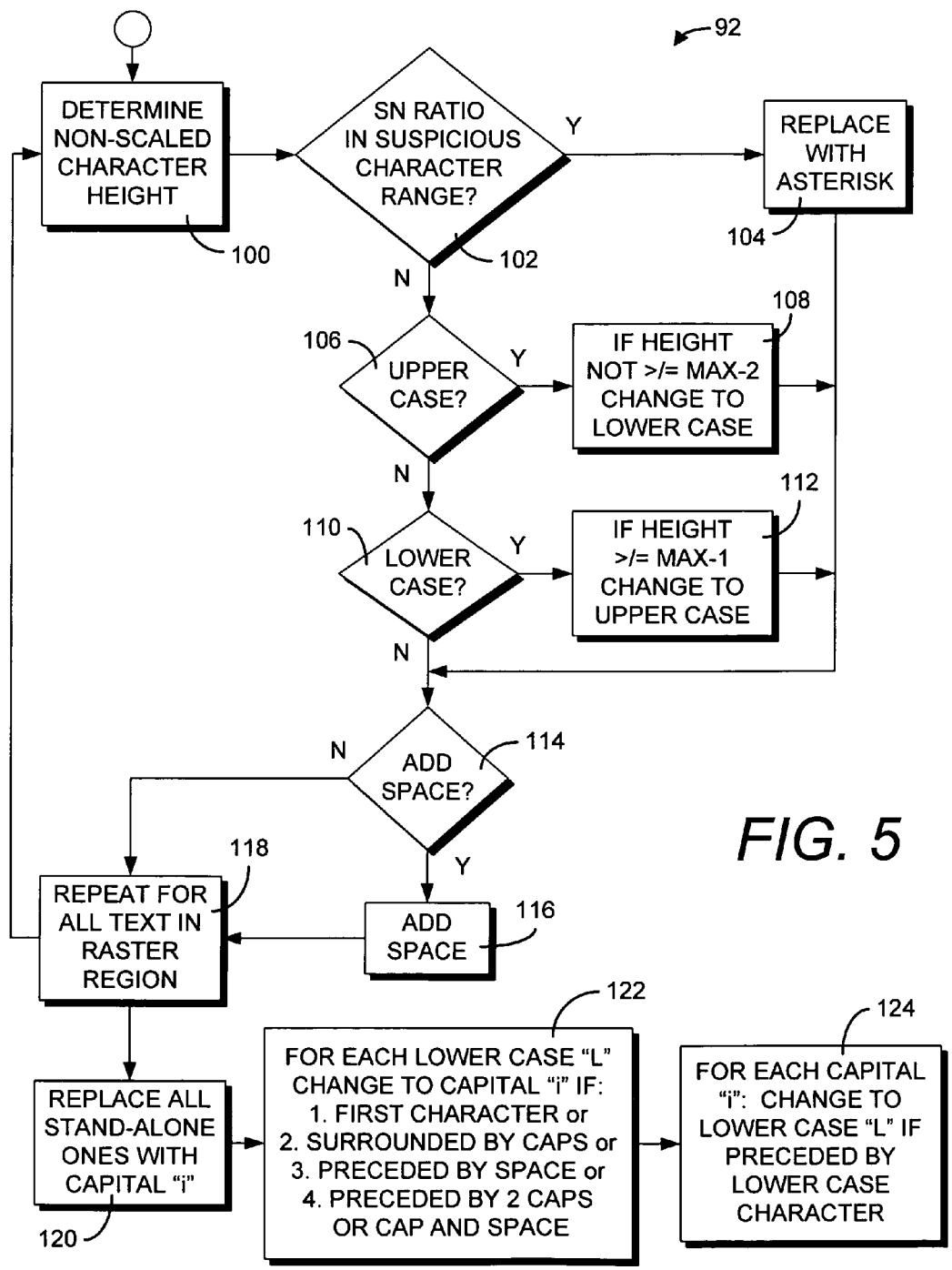
FIG. 5 is a flow diagram illustrating post-processing steps in the process of the present invention.

FIGS. 4*a*, 4*b*, and 5 illustrate component steps of the intelligent importation process 1 in greater detail than in FIG. 2. Referring to FIG. 4*a*, the user initiates the lookup of an image based on keys in the host application 3 at step 72 by accessing a screen in the application which has been previously set up, such as a data record, and activating the process 1 by operating a keystroke combination or clicking a particular icon. This causes the process 1 to extract raster data 44 from the pre-designated key region of the host application user interface (UI) or display 2, at step 14. This is done by the process 1 causing the reading and storing of pixel data currently stored in the previously designated coordinate range of the display buffer (not shown). The extracted raster data 44 is checked at step 74 to determine if the raster region is rendered in color or in a grayscale. If the raster region is in color, it is converted to a 256 level grayscale at step 76. At step 78, the grayscale raster data is thresholded to "binary colors", that is, black and white, based on the assumption that the most common color is background. The overall purpose of steps 74, 76, and 78 is to convert the raster data of the selected raster region, of whatever color combination, to black text on a white background to simplify the inputs to neural networks 18-20. The raster data from the selected raster region is then segmented at step 80 to separate the raster data of the raster region into raster data of the individual characters displayed.

Following segmentation 80, the raster data for each character is applied to raster, feature, and vector preprocessing steps 82, 83, and 84, as described with reference to the processing components 28 in FIG. 3, to derive respective data sets describing the unknown characters within the raster region according to different graphic criteria represented by raster processing, feature processing, and vector processing. The data sets, so derived, are applied as inputs to the raster neural network 18 at step 88, the feature neural network 19 at step 89, and the vector neural network 20 at step 90. The outputs of the neural network steps 88-90 are applied to respective post-processing steps 92 (FIG. 4*b*), as described by post-processing components 54, 55, and 56 of FIG. 3 and including the voting procedure 60.

FIG. 5 describes the post-processing steps 92 in greater detail. At step 100, the non-scaled height of the character is determined. This is the character height from the original raster region prior to any pre-processing. Proceeding from step 100, a check is made at step 102 of the signal to noise figure for the character block to determine if the number of any extraneous pixels in the background is such as to render the character indeterminate or a "suspicious" character. If so, the character is replaced with a designated suspicious character, such as an asterisk at step 104. If the character is not a suspicious character, an upper case verification check occurs at step 106 by determining if the character height is within 2 pixels of the maximum height of the preprocessed characters. If not, the character is changed to a lower case version at step 108. This test 106/108 is particularly important with the upper case characters: C, O, S, U, V, W, X, and Z. A somewhat similar lower case verification check 110 determines if the character height is within 1 pixel of the maximum height. If so, the character is changed to an upper case version of the character at step 112. Steps 110 and 112 are particularly important for the lower case characters: c, o, s, u, v, w, x, and z. If the character under analysis is recognized as an inter-word space at test 114 (in contrast to an inter-character space), a space in the key sequence is added at step 116. The post-processing steps 100-116 are all repeated at step 118 for each character of text detected in the raster region.

Steps 120, 122, and 124 deal with the distinguishing between the ambiguous characters "1", "I", and "l"; that is: the numeral "1" (one), the upper case "i" ("eye"), and the lower case "L" ("EL"), based on the context in which these characters occur in the original raster region. At a ones conversion step 120, all stand-alone ones are changed to capital "i". At an upper case "i" conversion step 122, each lower case "L" is changed to an upper case "i" if any of the following context conditions apply: if the character is the first character of a word; or if the character is surrounded by capital letters; or if the character is preceded by a space; or if the character is preceded by two capitals or a capital and a space. At a lower case "L" conversion step 124, the each upper case "i" is changed to a lower case "L" if the character is preceded by a lower case character.

Returning to FIG. 4b, if there are more characters to recognize in the raster region, as determined by test 128, the recognized and post-processed character, or suspicious character, is saved at step 130, the previously processed portion of the raster data is removed and/or segmentation 80 is performed on the remainder of the raster region at step 132. The results of post-processing 92 may indicate that the original segmentation 80 was inaccurate, whereby further attempts at re-segmentation are made to attempt to find separation between sequential characters represented in the raster region. When all the raster data for a given raster region have been processed, as indicated by test 128, the character string recognized is saved at step 134 as a key to an image 4 in the image management system 5. If the recognized key contains one or more suspicious or unrecognized characters, the process 1 preferably displays a message requiring user intervention to either verify a suggested identification of the incomplete key or to type in the character content of the designated raster region as a key.

If the accessed screen or record of the host application 3 contains more keys populating additional areas of the screen, as determined at test 136, the process 1 returns to the initiation step 72 (FIG. 4a). Otherwise, an image database of the image management system 5 is queried at step 138 for the image or images associated with the key or keys derived from the pre-designated raster regions and displayed at step 140. As described in reference to FIG. 2, images can also be associated with specific text entered in the designated regions and stored in the image management system 5 using steps similar to those illustrated in FIGS. 4a, 4b, and 5.

For further understanding of some of the terms used in this invention, a glossary is provided below:

Glossary

Artificial Neural Network (ANN): A neural network is a system of programs and data structures that approximates the operation of the human brain. A neural network usually involves a large number of processors operating in parallel, each with its own small sphere of knowledge and access to data in its local memory. Typically, a neural network is initially "trained" or fed large amounts of data and rules about data relationships (for example, "A mother is older than her daughter."). A program can then tell the network how to behave in response to an external stimulus (for example, to input from a computer user who is interacting with the network) or can initiate activity on its own (within the limits of its access to the external world).

In making determinations, neural networks use several principles, including gradient-based training, fuzzy logic, genetic algorithms, and Bayesian methods. Neural networks are sometimes described in terms of knowledge layers, with, in general, more complex networks having deeper layers. In feedforward systems, learned relationships about data can "feed forward" to higher layers of knowledge. Neural networks can also learn temporal concepts and have been widely used in signal processing and time series analysis.

Bi-cubic interpolation: In numerical analysis, a branch of mathematics, bicubic interpolation is one of the most common interpolation methods in two dimensions. With this method, the value f(x, y) of a function f at a point (x, y) is computed as a weighted average of the nearest sixteen pixels in a rectangular grid (a 4×4 array).

Binary: Binary describes a numbering scheme in which there are only two possible values for each digit: 0 and 1. The term also refers to any digital encoding/decoding system in which there are exactly two possible states. In digital data memory, storage, processing, and communications, the 0 and 1 values are sometimes called "low" and "high," respectively.

Fourier transforms: The Fourier transform, named after Joseph Fourier, is an integral transform that re-expresses a function in terms of sinusoidal basis functions, i.e. as a sum or integral of sinusoidal functions multiplied by some coefficients ("amplitudes").

Grayscale: In computing, a grayscale or greyscale digital image is an image in which the value of each pixel is a single sample. Displayed images of this sort are typically composed of shades of gray, varying from black at the weakest intensity to white at the strongest, though in principle the samples could be displayed as shades of any color, or even coded with various colors for different intensities. Grayscale images are distinct from black-and-white images, which in the context of computer imaging are images with only two colors, black and white; grayscale images have many shades of gray in between.

Histogram: A histogram is a specialized graph or plot used in statistics. In its most common form, the independent variable is plotted along the horizontal axis, and the dependent variable (usually a percentage) is plotted along the vertical axis. The independent variable can attain only a finite number of discrete values (for example, five) rather than a continuous range of values. The dependent variable can span a continuous range.

Raster data: Raster graphics are digital images created or captured (for example, by scanning in a photo) as a set of samples of a given space. A raster is a grid of x and y coordinates on a display space. (And for three-dimensional images, a z coordinate.) A raster image file identifies which of these coordinates to illuminate in monochrome or color values. The raster file is sometimes referred to as a bitmap because it contains information that is directly mapped to the display grid.

Segmentation: In image analysis, segmentation is the partition of a digital image into multiple regions (sets of pixels), according to some criterion. The goal of segmentation is typically to locate certain objects of interest which may be depicted in the image. Segmentation could therefore be seen as a computer vision problem. Unfortunately, many important segmentation algorithms are too simple to solve this problem accurately: they compensate for this limitation with their predictability, generality, and efficiency.

Vector data: Vector graphics or geometric modeling is the use of geometrical primitives such as points, lines, curves, and polygons to represent images in computer graphics. It is used by contrast to the term raster graphics, which is the representation of images as a collection of pixels (dots).

While the present invention describes particular techniques for deriving unique sets of data describing characters represented by raster data for use as inputs to artificial neural networks for recognition of the characters, such techniques are provided herein as exemplary embodiments of the invention. However, it is also foreseen that other known techniques for deriving unique data sets exist and could be advantageously employed in the present invention. Therefore, it is to be understood that while certain forms of the present invention have been illustrated and described herein, it is not to be limited to the specific forms or arrangement of parts described and shown.

What is claimed is:

1. A method for linking selected data being displayed by a host application executing on at least one processor to external file data, the method comprising:

enabling a user to display a graphic representation of a data record on a display via the host application, the data record comprising a selected data area corresponding to at least one area of the graphic representation;

executing an intelligent importation system at the at least one processor in response to user input to:

extract selected data from the selected data area;

process the selected data at the at least one processor to:

extract character data from the selected data;

analyze the character data extracted from the selected data via an artificial neural network to determine if the character data extracted from the selected data comprises recognized data, the artificial neural network comprising a raster neural network, a feature neural network, and a vector neural network, and wherein analyzing the character data comprises:

analyzing rectangular coordinates and a binary color of the character data at the raster neural network to generate a first character data value;

analyzing feature data of the character data via the feature neural network to generate a second character data value;

analyzing vectors corresponding to an outline of the character data at the vector neural network to generate a third character data value; and voting on the first, second, and third character data values to identify the recognized data;

generate a key based on the recognized data when the character data comprises the recognized data;

associate the key with external file data that is external to the host application, wherein the host application is incapable of directly rendering data from the external data file; and store the recognized data in a non-graphic format in a memory.

2. The method of claim 1 further comprising:

storing the external file data associated with the key in the memory;

thereafter, retrieving the stored external data file during execution of the host application by:

enabling the user to display the graphic representation of the data record on the display via the host application, the data record comprising a selected data area corresponding to at least one area of the graphic representation;

processing the selected data at the at least one processor to:

extract the character data from the selected data; and analyze the character data extracted from the selected data via the artificial neural network to determine if the character data extracted from the selected data comprises recognized data;

retrieving the key associated with the recognized data; and rendering the external data file associated with the key in an application capable of rendering the external data file.

3. The method of claim 1 wherein:

the graphic representation of the selected data includes a raster representation of the selected data; and the artificial neural network identifies the recognized data from the raster representation of the selected data.

4. The method of claim 1 wherein:

the graphic representation of the selected data is a raster representation of the selected data;

the raster representation is processed to generate a vector representation of the selected data; and the artificial neural network identifies the recognized data from the vector representation of the raster representation thereof.

5. The method of claim 1 wherein:

the graphic representation of the selected data is a raster representation of the selected data;

the raster representation is processed to a vector representation of the selected data;

the vector representation is processed by a Fourier transform to generate a set of Fourier coefficients associated with the vector representation; and the artificial neural network identifies the recognized data from the set of Fourier coefficients associated with the vector representation of the raster representation of the selected data.

6. The method of claim 1 wherein:

the graphic representation of the selected data includes a raster representation of the selected data;

a set of graphic features of the raster representation are extracted therefrom; and the artificial neural network identifies the recognized data from the set of graphic features of the raster representation.

7. The method of claim 6 wherein:

the set of graphic features includes a histogram formed by a list of pixel counts in a selected direction for the raster representation of the selected data.

8. The method of claim 6 wherein:

the set of graphic features includes a set of rectangular coordinates defining end points of character strokes of the raster representation of the selected data.

9. The method of claim 6 wherein:
the set of graphic features includes a set of rectangular coordinates defining locations of intersections of character strokes of the raster representation of the selected data.

10. The method of claim 1, wherein the graphic representation of the selected data comprises a first representation of the selected data and further comprises:
deriving a second representation of the selected data from the first representation thereof; and
processing the first and second representations of the selected data through the artificial neural network to identify the recognized data respectively from the first and second representations thereof.

11. A method for extracting selected data from a first application program executing on at least one processor to display the selected data as a graphic representation thereof, the method comprising:
causing display data displayed by the first application program during execution thereof to be retrieved, the display data including a first representation of the selected data which is a graphic representation of the selected data;
deriving a second representation of the selected data from the first representation thereof at the at least one processor;
processing at the at least one processor, the first and second representations of the display data through an artificial neural network, each trained to identify selected data comprising recognized data respectively from the first and second representations thereof, the artificial neural network comprising a raster neural network, a feature neural network, and a vector neural network, and wherein identifying the selected data comprises:
analyzing rectangular coordinates and a binary color of the selected data at the raster neural network to generate a first character data value;
analyzing feature data of the selected data at the feature neural network to generate a second character data value; and
analyzing vectors corresponding to an outline of the selected data at the vector neural network to generate a third character data value;
applying outputs of the raster neural network, the feature neural network, and the vector neural network to a voting procedure at the at least one processor to thereby collectively identify the recognized data from the first and second representations of the graphic representation thereof;
storing the recognized data identified from the voting procedure in a memory;
associating the recognized data with an external data file external to the first application program at the at least one processor, the first application program being incapable of directly rendering data from the external data file;
storing the external data file in the memory;
thereafter, retrieving the stored external data file from the memory during execution of the first application program at the at least one processor by:
selecting a screen displayed by the application program which includes first representation of the selected data which is a graphic representation of the selected data;
deriving the second representation of the selected data from the first representation thereof at the at least one processor;
processing the first and second representations of the selected data respectively through the artificial neural network at the at least one processor; and
applying outputs of the artificial neural network to a voting procedure at the at least one processor to thereby collectively identify the recognized data from the first and second representations of the graphic representation thereof;
retrieving the stored external data file associated with the recognized data from the memory; and
rendering data of the external data file via a second application program executing on the at least one processor.

12. A method for linking external data files to an application program executing on at least one processor, wherein during execution the application program provides displays of a user interface substantially entirely as a raster pattern of pixels and which is not capable of directly rendering data in the external data file, the method comprising:
causing display data displayed in a graphic representation by the application program during execution thereof to be retrieved, the display data comprising a selected data area corresponding to at least one area of the graphic representation;
processing, at the at least one processor, the display data through an artificial neural network trained to identify recognized data from selected data within the selected data area of the graphic representation thereof, the artificial neural network comprising a raster neural network, a feature neural network, and a vector neural network, and wherein analyzing the character data comprises:
analyzing rectangular coordinates and a binary color of the character data at the raster neural network to generate a first character data value;
analyzing feature data of the character data at feature neural network to generate a second character data value;
analyzing vectors corresponding to an outline of the character data at the vector neural network to generate a third character data value; and
voting on the first, second, and third character data values to identify the recognized data;
storing recognized data from the graphic representation thereof in a non-graphic format; and
associating the recognized selected data with an external data file external to the application program at the at least one processor, the application program being incapable of directly rendering data from the external data file.

13. The method of claim 12 further comprising:
retrieving the stored external data file during execution of the application program, the retrieval comprising:
designating an area of the display being displayed by the application which comprises a graphic representation of the selected data; and
processing the display data comprising the graphic representation of the selected data through the artificial neural network system to identify the selected data;
retrieving the stored external data file associated with the selected data from the memory; and
rendering data of the external data file in a different application program capable of rendering the data of the external data file.

14. The method of claim 12 wherein:
the graphic representation of the selected data comprises a raster representation of the selected data; and
the artificial neural network system identifies the recognized data from the raster representation thereof.

15. The method of claim 12 wherein:
the graphic representation of the selected data comprises a raster representation of the selected data;
the raster representation is processed to a vector representation thereof; and
the artificial neural network system identifies the recognized data from the vector representation of the raster representation thereof.

16. The method of claim 12 wherein:
the graphic representation of the selected data comprises a raster representation of the selected data;
the raster representation is processed to a vector representation thereof;
the vector representation is processed by a Fourier transform to generate a set of Fourier coefficients associated with the vector representation; and
the artificial neural network system identifies the recognized data from the set of Fourier coefficients associated with the vector representation of the raster representation of the selected data.

17. The method of claim 12 wherein:
the graphic representation of the selected data comprises a raster representation of the selected data;
a set of graphic features are extracted from the raster representation; and
the artificial neural network system identifies the recognized data from the set of graphic features.

18. The method of claim 17 wherein:
the set of graphic features comprises a histogram formed by a list of pixel counts in a selected direction for the raster representation of the selected data.

19. The method of claim 17 wherein:
the set of graphic features comprises a set of rectangular coordinates defining the end points of character strokes of the raster representation of the selected data.

20. The method of claim 17 wherein:
the set of graphic features comprises a set of rectangular coordinates defining the locations of intersections of character strokes of the raster representation of the selected data.

21. The method of claim 12 wherein the graphic representation of the selected data comprises a first representation of the selected data and comprising the steps of:
deriving a second representation of the selected data from the first representation; and
processing the first and second representations of the selected data through the artificial neural network systems to identify the recognized data from the first and second representations, respectively.

22. An intelligent importation method for linking external data files to a first application program executing on at least one processor, wherein during execution the first application program provides displays of a user interface substantially entirely as a raster pattern of pixels and which is not capable of directly rendering data in the external data file, the method comprising:
causing display data displayed in a graphic representation by the first application program during execution thereof to be retrieved, the display data comprising a first representation of selected data within the graphic representation;
deriving a second representation of the selected data from the first representation thereof;
processing, at the at least one processor, the first representations of the display data through a first artificial neural network by analyzing rectangular coordinates and a binary color of the first representation of the selected data to generate a first output;
processing, at the at least one processor, the second representation of the display data through a second artificial neural network by analyzing feature data of the second representation of the selected data to generate a second output;
applying the first and second outputs of the first and second artificial neural networks to a voting procedure at the at least one processor to thereby collectively identify the recognized data from the first and second representations of the graphic representation thereof;
storing the recognized data identified from the voting procedure in a memory;
associating the recognized data with an external data file external to the first application program at the at least one processor, the first application program being incapable of directly rendering data from the external data file;
storing the external data file in the memory;
thereafter, retrieving the stored external data file from the memory during execution of the first application program at the at least one processor by the steps of:
selecting a screen displayed by the first application program which includes first representation of the selected data which is a graphic representation of the selected data;
deriving the second representation of the selected data from the first representation thereof at the at least one processor;
processing the first and second representations of the selected data respectively through the first and second artificial neural networks at the at least one processor; and
applying outputs of the first and second artificial neural networks to a voting procedure at the at least one processor to thereby collectively identify the recognized data from the first and second representations of the graphic representation thereof;
retrieving the stored external data file associated with the recognized data from the memory; and
rendering data of the external data file via a second application program executing on the at least one processor.

23. A system for linking selected data being displayed by a host application to external file data, the system comprising:
a memory; and
at least one processor to:
execute the host application to display a graphic representation of a data record on a display, the data record comprising a selected data area corresponding to at least one area of the graphic representation;
execute an intelligent importation system in response to user input to:
extract selected data from the selected data area;
process the selected data to:
extract character data from the selected data;
analyze the character data extracted from the selected data via an artificial neural network to determine if the character data extracted from the selected data comprises recognized data the artificial neural network comprising a raster neural network, a feature neural network, and a vector neural network, and wherein analyzing the character data comprises:
analyzing rectangular coordinates and a binary color of the character data at the raster neural network to generate a first character data value;

analyzing feature data of the character data at the feature neural network of the artificial neural network to generate a second character data value; and analyzing vectors corresponding to an outline of the character data at the vector neural network to generate a third character data value;

voting on the first, second, and third character values to identify the recognized data;

generate a key based on the recognized data; and associate the key with external file data that is external to the host application, wherein the host application is incapable of directly rendering data from the external data file;

store the recognized data in a non-graphic format in the memory; and store the external file data associated with the key in the memory.

24. A system for linking external data files to first application program that provides displays of a user interface substantially entirely as a raster pattern of pixels and which is not capable of directly rendering data in the external data file, the system comprising:

a memory;

at least one processor to:

execute the first application program to retrieve display data for display in a graphic representation, the display data comprising a first representation of selected data within the graphic representation;

execute an intelligent importation system in response to user input to:

derive a second representation of the selected data from the first representation thereof;

process the first representation of the selected data by analyzing rectangular coordinates and a binary color of the display data at a first artificial neural network;

process the second representation of the display data by analyzing feature data of the selected data at a second artificial neural network, wherein the first artificial neural network and the second artificial neural network are each trained to identify selected data comprising recognized data respectively from the first and second representations thereof;

apply outputs of the first and second artificial neural networks to a voting procedure to thereby collectively identify the recognized data from the first and second representations of the graphic representation thereof;

store the recognized data identified from the voting procedure in the memory;

associate the recognized data with an external data file external to the first application program, the first application program being incapable of directly rendering data from the external data file;

store the external data file in the memory;

thereafter, retrieve the stored external data file from the memory during execution of the first application program by:

selecting a screen displayed by the first application program which includes first representation of the selected data which is a graphic representation of the selected data;

deriving the second representation of the selected data from the first representation thereof;

processing the first and second representations of the selected data respectively through the first and second artificial neural networks; and applying outputs of the first and second artificial neural networks to a voting procedure to thereby collectively identify the recognized data from the first and second representations of the graphic representation thereof;

retrieve the stored external data file associated with the recognized data from the memory; and execute a second application program to render data of the external data file.

\* \* \* \* \*